(12) United States Patent
Igarashi

(10) Patent No.: US 8,205,635 B2
(45) Date of Patent: Jun. 26, 2012

(54) FLOWMETER AND FLOW-RATE CONTROLLER

(75) Inventor: Hiroki Igarashi, Gyoda (JP)

(73) Assignee: Surpass Industry Co., Ltd., Gyoda-shi (JP)

( * ) Notice: Subject to any disclaimer, the term of this patent is extended or adjusted under 35 U.S.C. 154(b) by 352 days.

(21) Appl. No.: 12/698,184

(22) Filed: Feb. 2, 2010

(65) Prior Publication Data
US 2010/0193056 A1 Aug. 5, 2010

(30) Foreign Application Priority Data
Feb. 5, 2009 (JP) .................................. 2009-024713

(51) Int. Cl.
*F16K 31/12* (2006.01)
*F16K 31/36* (2006.01)
(52) U.S. Cl. ................. 137/487.5; 137/486; 137/625.29; 137/614.19; 251/118; 73/861.52
(58) Field of Classification Search .................. 137/486, 137/487.5, 614, 884, 625.29, 625.3, 625.33, 137/614.17; 251/118; 73/861.52, 861, 861.63, 73/861.64, 202
See application file for complete search history.

(56) References Cited

U.S. PATENT DOCUMENTS

| | | | |
|---|---|---|---|
| 4,394,816 A * | 7/1983 | Voorhis | 62/205 |
| 4,461,173 A | 7/1984 | Olin | |
| 5,816,285 A * | 10/1998 | Ohmi et al. | 137/487.5 |
| 5,975,126 A * | 11/1999 | Bump et al. | 137/487.5 |
| 2007/0089788 A1* | 4/2007 | Chinnock et al. | 137/487.5 |

FOREIGN PATENT DOCUMENTS

| | | |
|---|---|---|
| EP | 1901154 A1 | 3/2008 |
| EP | 1912105 A1 | 4/2008 |
| JP | 5782714 A | 5/1982 |
| JP | 2007034667 | 2/2007 |
| WO | 2006004674 A2 | 1/2006 |

OTHER PUBLICATIONS

European Search Report for EP10151881.9 dated Jul. 7, 2010.

* cited by examiner

*Primary Examiner* — Stephen Hepperle
*Assistant Examiner* — Seth Faulb
(74) *Attorney, Agent, or Firm* — Pearne & Gordon LLP

(57) ABSTRACT

A flowmeter in which a flow rate can be measured over a wide flow-rate range while an increase in the cost of manufacture thereof is minimized, and a flow-rate controller equipped with such a flowmeter are provided. Provided are an upstream-side pressure sensor that measures the pressure of a fluid in an upstream-side channel, a downstream-side pressure sensor that measures the pressure of the fluid in a downstream-side channel, a first throttle section disposed between the upstream-side channel and the downstream-side channel and having a channel area that is smaller than that of at least the upstream-side channel, a bypass channel branching off from between the upstream-side pressure sensor in the upstream-side channel and the first throttle section and connected with the downstream-side channel, an on/off valve that controls the flow rate of the fluid flowing through the bypass channel, and a second throttle section disposed between the bypass channel and the downstream-side channel and having a channel area that is smaller than that of at least the bypass channel.

6 Claims, 5 Drawing Sheets

FLOWMETER AND FLOW-RATE CONTROLLER

BACKGROUND OF THE INVENTION

1. Field of the Invention

The present invention relates to flowmeters suitably used for measuring the flow rate of a fluid in fluid transport pipes in various industrial fields, such as chemical factories, semiconductor manufacturing, food manufacturing, and biotechnology, and to flow-rate controllers equipped with such flowmeters.

This application is based on Japanese Patent Application No. 2009-024713, the content of which is incorporated herein by reference.

2. Description of Related Art

In the related art, various kinds of flowmeters for measuring the flow rate of a fluid have been proposed. One example is a differential-pressure flowmeter that is advantageous when, for example, measuring the flow velocity of a liquid since the flowmeter can accurately measure a flow rate with the occurrence of fewer measurement errors, as compared with a laser flowmeter or the like that is susceptible to the effect of air bubbles included in a fluid. Therefore, various flow-rate controllers using differential-pressure flowmeters have been proposed (for example, see Japanese Unexamined Patent Application, Publication No. 2007-34667).

However, a differential-pressure flowmeter has a problem in that the measurable flow-rate range thereof is limited, as compared with flowmeters of other types. Specifically, the problem is that the upper limit of the measurable flow-rate range is limited to a flow rate that is about ten times the flow rate at the lower limit.

Therefore, one conceivable method of measuring the flow rate of a fluid in a range exceeding the measurable flow-rate range in a differential-pressure flowmeter is using a combination of multiple differential-pressure flowmeters.

However, this is problematic in that the cost of manufacture of the flowmeter or the flow-rate controller increases due to an increase in the number of flowmeters to be used for measuring the flow rate.

BRIEF SUMMARY OF THE INVENTION

The present invention has been made in view of these circumstances, and an object thereof is to provide a flowmeter in which a flow rate can be measured over a wide flow-rate range while an increase in the cost of manufacture thereof is minimized, and to provide a flow-rate controller equipped with such a flowmeter.

In order to achieve the aforementioned object, the present invention provides the following solutions.

A flowmeter according to a first aspect of the present invention includes an upstream-side channel and a downstream-side channel through which a fluid, which is a measurement target, flows; an upstream-side pressure sensor that measures the pressure of the fluid in the upstream-side channel; a downstream-side pressure sensor that measures the pressure of the fluid in the downstream-side channel; a first throttle section disposed between the upstream-side channel and the downstream-side channel and having a channel area that is smaller than that of at least the upstream-side channel; a bypass channel branching off from between the upstream-side pressure sensor in the upstream-side channel and the first throttle section and connected with the downstream-side channel; an on/off valve that controls the flow rate of the fluid flowing through the bypass channel; and a second throttle section disposed between the bypass channel and the downstream-side channel and having a channel area that is smaller than that of at least the bypass channel.

According to the first aspect of the present invention, since the first throttle section, the second throttle section, and the on/off valve for controlling the flow of the fluid in the second throttle section are provided, the flow rate can be measured over a wide flow-rate range while an increase in the cost of manufacture can be minimized.

Specifically, when the flow rate of the fluid, which is a measurement target, is within a flow-rate range that can be measured by using the first throttle section alone, the on/off valve is closed so that the fluid is made to pass through only the first throttle section, and the upstream-side pressure sensor and the downstream-side pressure sensor are used to measure the difference in pressure of the fluid before and after the first throttle section, thereby measuring the flow rate of the fluid.

On the other hand, if the flow rate of the fluid, which is a measurement target, exceeds the flow-rate range that can be measured by using the first throttle section alone, the on/off valve is opened so that the fluid is made to pass through the first throttle section and the second throttle section, and the upstream-side pressure sensor and the downstream-side pressure sensor are used to measure the difference in pressure of the fluid before and after the first throttle section and the second throttle section, thereby measuring the flow rate of the fluid.

In the above aspect, the first throttle section preferably has a channel sectional area that is smaller than that of the second throttle section.

With this configuration, a smaller flow rate of a fluid can be measured, as compared with a case where the first throttle section has a larger channel sectional area than that of the second throttle section or a case where the two throttle sections have substantially the same channel sectional area.

In the above aspect, the on/off valve is preferably provided with a valve plug and a valve seat, and a surface of the valve seat is preferably disposed on substantially the same plane as a lower end of an inner surface of the bypass channel extending substantially horizontally from the on/off valve towards the second throttle section.

With this configuration, when the on/off valve is closed, the fluid can be prevented from accumulating in the on/off valve, as well as between the on/off valve and the second throttle section in the bypass channel.

Specifically, when the on/off valve is closed, the fluid remaining in the on/off valve can flow out to the downstream-side channel via the bypass channel and the second throttle section.

In the above aspect, a first housing in which the upstream-side channel, the upstream-side pressure sensor, the first throttle section, the bypass channel, the second throttle section, and the on/off valve are disposed and a second housing in which the downstream-side channel and the downstream-side pressure sensor are disposed are preferably provided, and the first housing and the second housing are preferably connectable to and disconnectable from each other.

With this configuration, because the first housing and the second housing can be disconnected from each other, the first throttle section and the second throttle section can be exposed. This facilitates replacement of the first throttle section and the second throttle section, as well as maintenance thereof, such as cleaning.

In the above configuration, it is preferable that at least one of the first throttle section and the second throttle section be detachable from the first housing.

With this configuration, since at least one of the first throttle section and the second throttle section is detachable from the first housing, maintenance of at least one of the first throttle section and the second throttle section is further facilitated.

In addition, at least one of the first throttle section and the second throttle section can be replaced with another throttle section.

A flow-rate controller according to a second aspect of the present invention includes the flowmeter according to the first aspect and a control valve that controls the flow rate of the fluid.

According to the second aspect of the present invention, since the flowmeter according to the first aspect is included, the flow rate of the fluid can be controlled over a wide flow-rate range.

With the flowmeter and the flow-rate controller of the present invention, since the first throttle section, the second throttle section, and the on/off valve for controlling the flow of the fluid in the second throttle section are provided, the flow rate can be measured over a wide flow-rate range while an increase in the cost of manufacture can be minimized.

DETAILED DESCRIPTION OF THE INVENTION

A flow-rate controller according to an embodiment of the invention will be described with reference to FIGS. 1 to 5.

Figure 1:
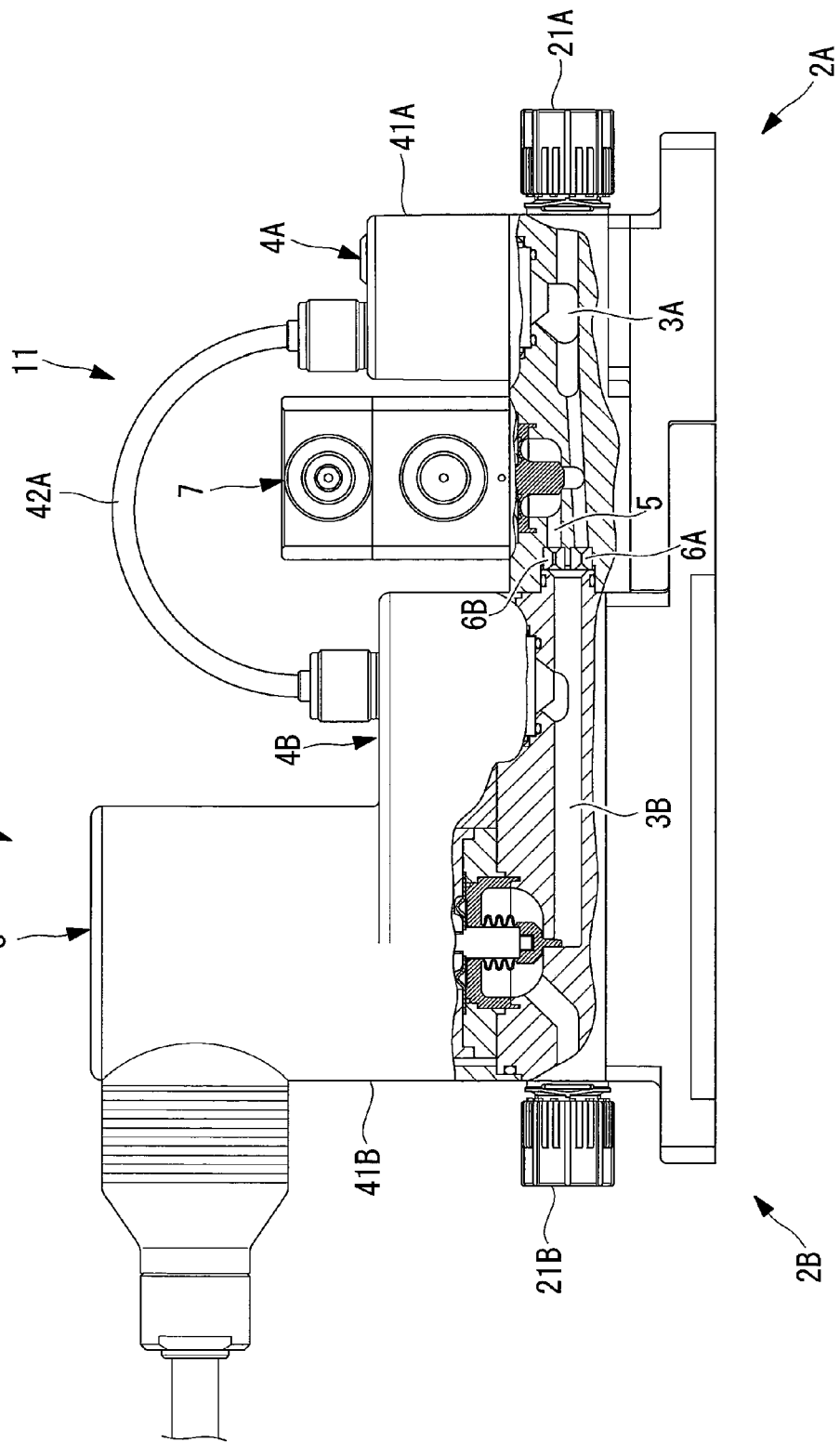
FIG. 1 is a schematic diagram for explaining the general configuration of a flow-rate controller according to an embodiment of the present invention.

FIG. 1 is a schematic diagram for explaining the general configuration of the flow-rate controller according to this embodiment.

In this embodiment, a flow-rate controller 1 according to the present invention is described as being applied to a type that controls the flow rate of a chemical solution used in the production of semiconductors and the like.

Figure 5:
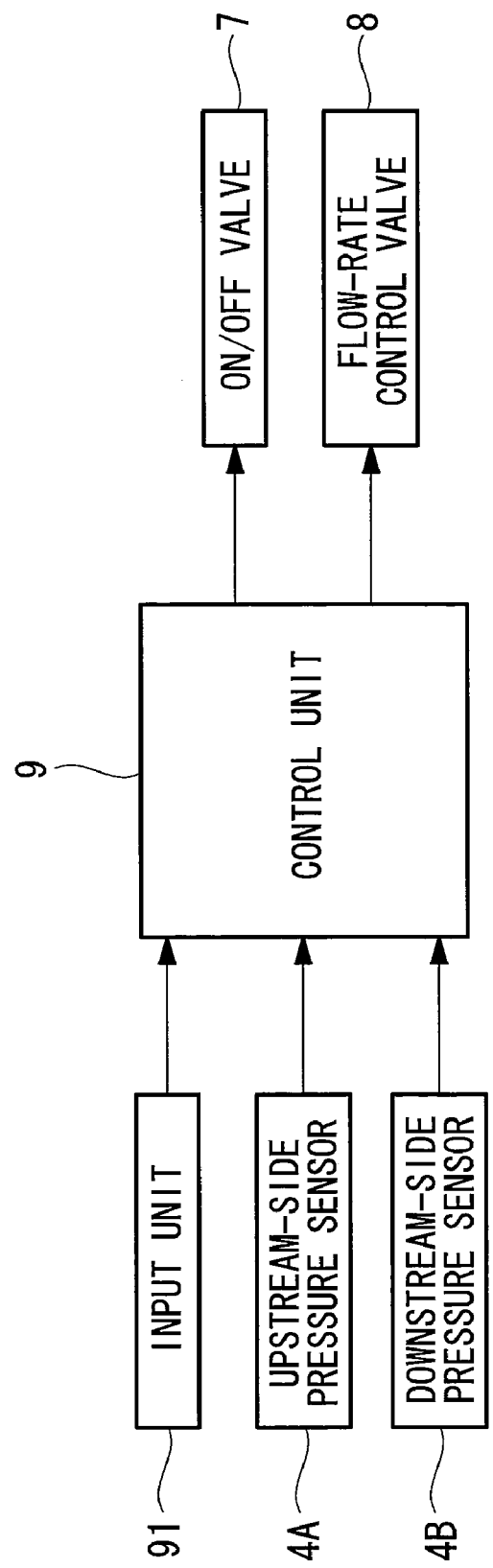
FIG. 5 is a block diagram for explaining the configuration of a control unit.

As shown in FIG. 1, the flow-rate controller 1 is provided with a first body (first housing) 2A and a second body (second housing) 2B, an upstream-side channel 3A and a downstream-side channel 3B, an upstream-side pressure sensor 4A and a downstream-side pressure sensor 4B, a bypass channel 5, a first orifice section (first throttle section) 6A and a second orifice section (second throttle section) 6B, an on/off valve 7, a flow-rate control valve (control valve) 8, and a control unit 9 (see FIG. 5).

In other words, the flow-rate controller 1 is provided with a differential-pressure flowmeter (flowmeter) 11 constituted of the upstream-side pressure sensor 4A, the downstream-side pressure sensor 4B, the bypass channel 5, the first orifice section 6A, the second orifice section 6B, the on/off valve 7, and the like and a flow-rate control unit 12 constituted of the flow-rate control valve 8, the control unit 9, and the like.

As shown in FIG. 1, the first body 2A and the second body 2B define the external shape of the flow-rate controller 1 and accommodate the components constituting the differential-pressure flowmeter 11 and the components constituting the flow-rate control unit 12.

The first body 2A and the second body 2B are preferably composed of a material with high resistance against the chemical solution whose flow rate is to be controlled, that is, a material with high chemical resistance.

Specifically, the first body 2A and the second body 2B are preferably composed of a fluoroplastic material, such as polytetrafluoroethylene (PTFE), polychlorotrifluoroethylene (PCTFE), or tetrafluoroethylene-perfluoroalkylvinylether copolymer (PFA), or a material such as polyether ether ketone (PEEK (registered trademark)).

Figure 2:
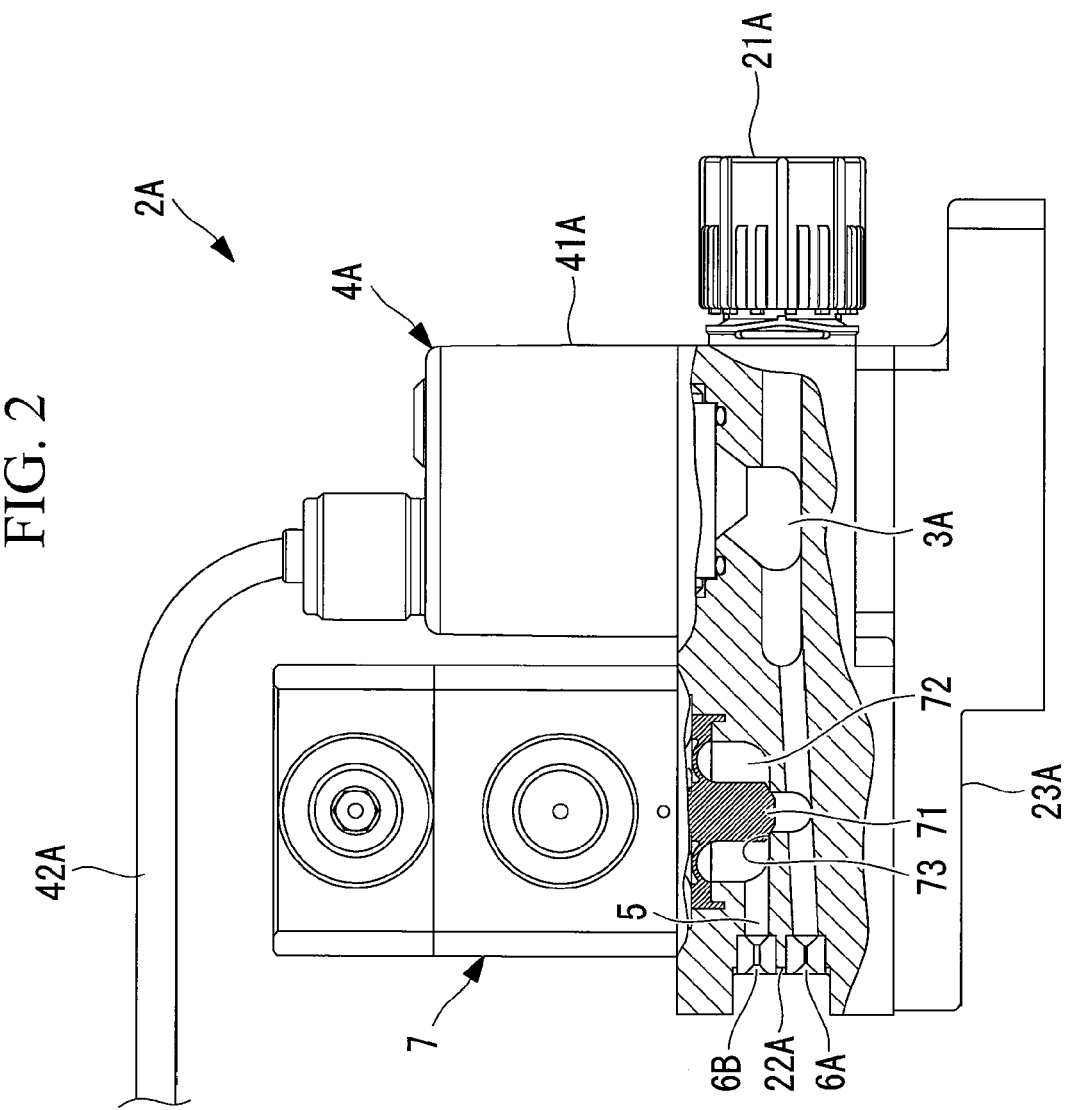
FIG. 2 is a schematic diagram for explaining the configuration of a first body in FIG. 1.
Figure 3:
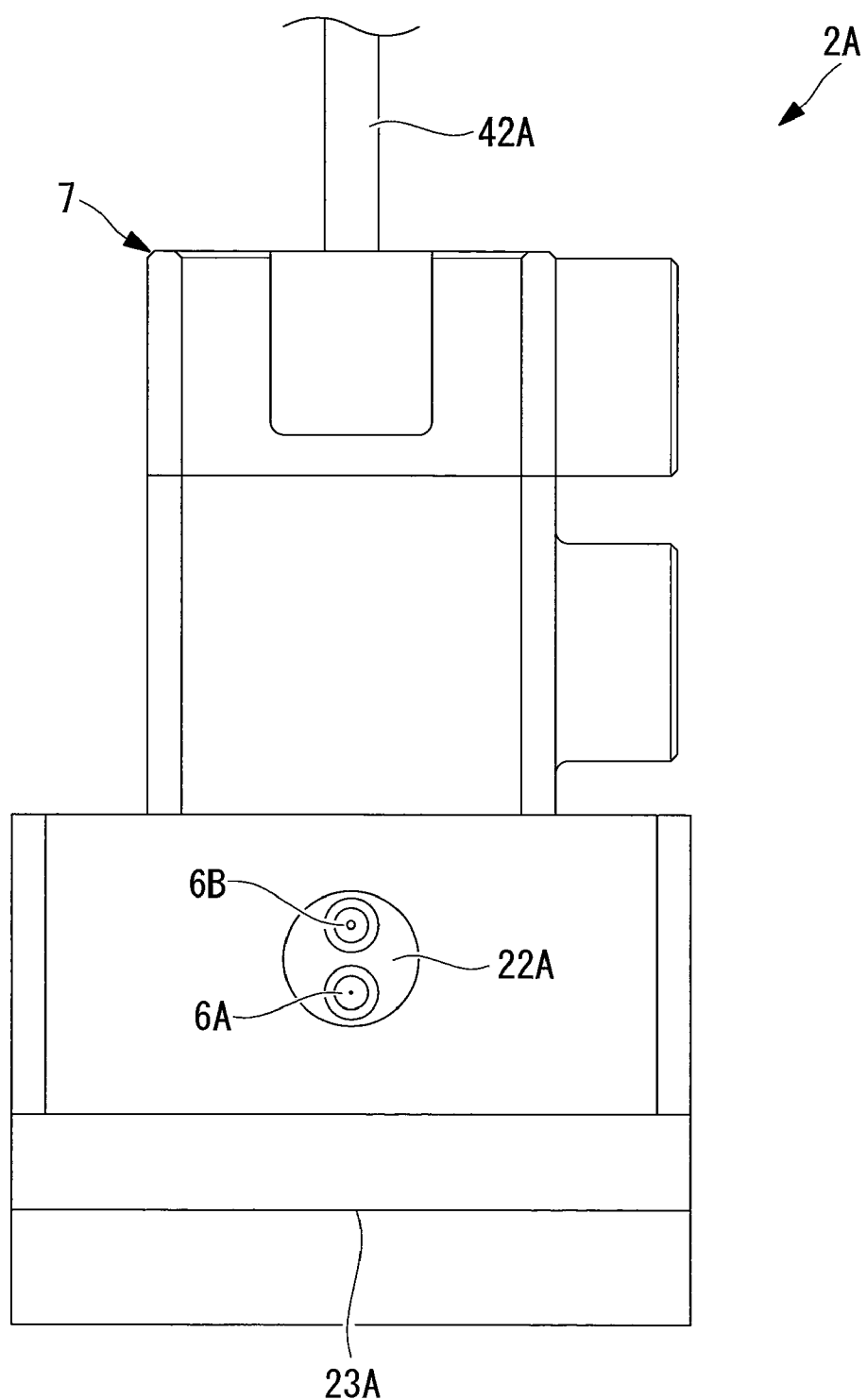
FIG. 3 is a side view for explaining the configuration of the first body in FIG. 2.

FIG. 2 is a schematic diagram for explaining the configuration of the first body in FIG. 1. FIG. 3 is a side view for explaining the configuration of the first body in FIG. 2.

As shown in FIGS. 2 and 3, the first body 2A is provided with the upstream-side channel 3A, the upstream-side pressure sensor 4A, the bypass channel 5, the first orifice section 6A, the second orifice section 6B, and the on/off valve 7.

Furthermore, the first body 2A is also provided with an upstream-side connector 21A used for connecting with an external channel, and a first recess 22A and a second recess 23A used for joining the first body 2A to the second body 2B.

As shown in FIG. 2, the upstream-side connector 21A is a connector disposed on a side surface of the first body 2A and allows the external channel and the upstream-side channel 3A to communicate with each other.

As shown in FIGS. 2 and 3, the first recess 22A is a section to be engaged with a first protrusion 22B of the second body 2B and is a recess formed in a substantially cylindrical shape in a surface of the first body 2A that faces the second body 2B.

Furthermore, the upstream-side channel 3A and the bypass channel 5 open in the bottom surface of the first recess 22A. The opening of the upstream-side channel 3A is provided with a depression in which the first orifice section 6A is disposed, and the opening of the bypass channel 5 is provided with a depression in which the second orifice section 6B is disposed.

As shown in FIGS. 2 and 3, the second recess 23A is a section to be engaged with a second protrusion 23B of the second body 2B. In other words, the second recess 23A is a section, of the bottom surface of the first body 2A, that is depressed facing the second body 2B and open towards the second body 2B.

Figure 4:
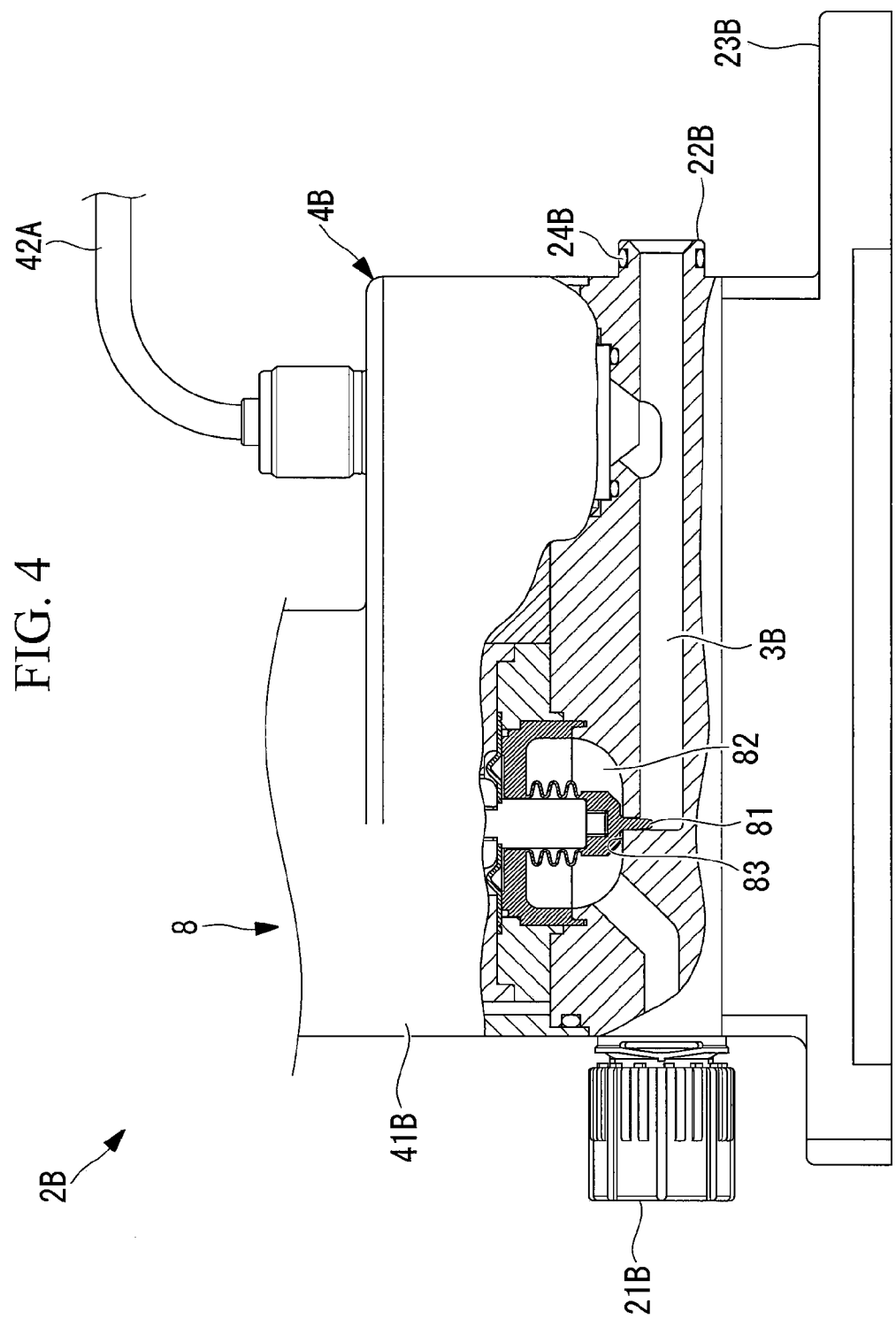
FIG. 4 is a schematic diagram for explaining the configuration of a second body in FIG. 1.

FIG. 4 is a schematic diagram for explaining the configuration of the second body 2B in FIG. 1.

As shown in FIG. 4, the second body 2B is provided with the downstream-side channel 3B, the downstream-side pressure sensor 4B, and the flow-rate control valve (control valve) 8.

Furthermore, the second body 2B is also provided with a downstream-side connector 21B used for connecting with an external channel, and the first protrusion 22B and the second protrusion 23B used for joining the second body 2B to the first body 2A.

As shown in FIG. 4, the downstream-side connector 21B is a connector disposed on a side surface of the second body 2B and allows the external channel and the downstream-side channel 3B to communicate with each other.

As shown in FIG. 4, the first protrusion 22B is a section to be engaged with the first recess 22A of the first body 2A and is a protrusion formed in a substantially cylindrical shape on a surface of the second body 2B that faces the first body 2A.

Furthermore, the inside of the first protrusion 22B acts as the downstream-side channel 3B, and the outer surface of the first protrusion 22B is provided with an O-ring 24B that is brought into contact with the inner surface of the first recess 22A to prevent the chemical solution from leaking.

On the other hand, the first protrusion 22B is configured so as to press the first orifice section 6A and the second orifice section 6B against the bottom surface of the first recess 22A when the first body 2A and the second body 2B are combined.

As shown in FIG. 4, the second protrusion 23B is a section to be engaged with the second recess 23A of the first body 2A. In other words, the second protrusion 23B is a section of the bottom surface of the second body 2B that protrudes toward the first body 2A.

By allowing the first body 2A and the second body 2B to be detachable in this manner, the first orifice section 6A and the second orifice section 6B can be exposed. This facilitates replacement of the first orifice section 6A and the second orifice section 6B, as well as maintenance thereof, such as cleaning.

As shown in FIG. 1, the upstream-side channel 3A and the downstream-side channel 3B are channels through which an externally-supplied chemical solution flows.

As shown in FIG. 2, the upstream-side channel 3A is formed inside the first body 2A and is a channel through which an externally-supplied chemical solution flows. Moreover, the upstream-side channel 3A connects with the upstream-side connector 21A and the downstream-side channel 3B.

The upstream-side channel 3A is provided with the upstream-side pressure sensor 4A, the bypass channel 5, and the first orifice section 6A in that order from the upstream side as viewed in the direction of flow of the chemical solution.

Specifically, a branch channel that extends toward the upstream-side pressure sensor 4A is provided between an upstream end of the upstream-side channel 3A and a section thereof that connects with the bypass channel 5. With this branch channel, contact between a pressure detection surface of the upstream-side pressure sensor 4A and the chemical solution is ensured.

Furthermore, an upstream end of the bypass channel 5 is connected between the upstream-side pressure sensor 4A in the upstream-side channel 3A and the disposed position of the first orifice section 6A.

On the other hand, a downstream end of the upstream-side channel 3A is provided with a depression in which the first orifice section 6A is disposed in a detachable manner.

Making the first orifice section 6A detachable from the first body 2A in this manner facilitates maintenance of the first orifice section 6A. In addition, the first orifice section 6A can be replaced with another orifice section.

On the other hand, the upstream-side channel 3A is formed so as to bend downward towards the downstream side from an intermediate section thereof.

Specifically, an upstream segment of the upstream-side channel 3A, in other words, a segment from a section thereof connected with the upstream-side connector 21A to a section between the upstream-side pressure sensor 4A and the bypass channel 5, is made to extend substantially horizontally, whereas a downstream segment, in other words, a segment from the section between the upstream-side pressure sensor 4A and the bypass channel 5 to the downstream end, is sloped downward towards the downstream side.

The upstream-side channel 3A may be formed so as to bend downward towards the downstream side from the intermediate section thereof, as described above, or may be formed so as to extend in the substantially horizontal direction from the upstream end to the downstream end, and is not limited in particular.

As shown in FIG. 4, the downstream-side channel 3B is formed inside the second body 2B and is a channel through which an externally-supplied chemical solution flows. Moreover, the downstream-side channel 3B connects with the upstream-side channel 3A and the downstream-side connector 21B.

The downstream-side channel 3B is provided with the downstream-side pressure sensor 4B and the flow-rate control valve 8 in that order from the upstream side as viewed in the direction of flow of the chemical solution.

Specifically, a branch channel that extends toward the downstream-side pressure sensor 4B is provided between an upstream end of the downstream-side channel 3B and the disposed position of the flow-rate control valve 8. With this branch channel, contact between a pressure detection surface of the downstream-side pressure sensor 4B and the chemical solution is ensured.

Furthermore, the flow-rate control valve 8 is disposed between the downstream-side pressure sensor 4B in the downstream-side channel 3B and a downstream end of the downstream-side channel 3B.

The upstream-side pressure sensor 4A is configured to measure the pressure of the chemical solution flowing through the upstream-side channel 3A, as shown in FIG. 2, whereas the downstream-side pressure sensor 4B is configured to measure the pressure of the chemical solution flowing through the downstream-side channel 3B, as shown in FIG. 4.

Sensors to be used as the upstream-side pressure sensor 4A and the downstream-side pressure sensor 4B may be of any kind so long as they can measure the pressure of a fluid, such as a liquid, and may include, for example, piezoelectric-type pressure sensors, capacitance-type pressure sensors, and strain-gauge-type pressure sensors.

As shown in FIG. 2, the upstream-side pressure sensor 4A is disposed in the first body 2A and is covered by an upstream-side cover 41A. Thus, the upstream-side pressure sensor 4A is prevented from coming into contact with, for example, vapor of the chemical solution.

Specifically, the upstream-side pressure sensor 4A is disposed adjacent to the on/off valve 7, located at the upper surface of the first body 2A, on the upstream side thereof (i.e., the right side thereof in FIG. 2) as viewed in the direction of flow of the chemical solution.

As shown in FIGS. 1 and 2, the upstream-side pressure sensor 4A is connected with a sensor cable 42A that transmits a signal related to the detected pressure of the chemical solution.

As shown in FIG. 1, the sensor cable 42A extends from the upstream-side cover 41A to a downstream-side cover 41B and inputs the pressure-related signal output from the upstream-side pressure sensor 4A to the control unit 9.

As shown in FIG. 4, the downstream-side pressure sensor 4B is disposed in the second body 2B and is covered by the downstream-side cover 41B together with the flow-rate control valve 8. Thus, the downstream-side pressure sensor 4B and the flow-rate control valve 8 are prevented from coming into contact with, for example, vapor of the chemical solution.

Specifically, the downstream-side pressure sensor 4B is disposed adjacent to the flow-rate control valve 8, located at the upper surface of the second body 2B, on the upstream side thereof (i.e., the right side thereof in FIG. 4) as viewed in the direction of flow of the chemical solution.

As shown in FIG. 2, the bypass channel 5 is formed inside the first body 2A and branches off from the upstream-side channel 3A.

The bypass channel 5 is provided with the on/off valve 7 and the second orifice section 6B in that order from the upstream side as viewed in the direction of flow of the chemical solution.

Specifically, the bypass channel 5 extends upward (upward in FIG. 2) from between the upstream-side pressure sensor 4A in the upstream-side channel 3A and the first orifice section 6A and connects with a valve chamber 72 of the on/off valve 7. Furthermore, the bypass channel 5 extends in the substantially horizontal direction (left-right direction in FIG. 2) from a side surface of the valve chamber 72 and connects with the downstream-side channel 3B.

A lower end of the bypass channel 5 extending from this valve chamber 72 to the second orifice section 6B is disposed on substantially the same plane as a valve seat 73 of the on/off valve 7.

Thus, when the on/off valve 7 is closed, the chemical solution can be prevented from accumulating in the valve chamber 72, which is the inside of the on/off valve 7, as well as between the on/off valve 7 and the second orifice section 6B in the bypass channel 5.

Specifically, when the on/off valve 7 is closed, the chemical solution remaining in the valve chamber 72 can flow out to the downstream-side channel 3B via the bypass channel 5 and the second orifice section 6B.

On the other hand, a downstream end of the bypass channel 5 is provided with a depression in which the second orifice section 6B is disposed in a detachable manner.

Making the second orifice section 6B detachable from the first body 2A in this manner further facilitates maintenance of the second orifice section 6B. In addition, the second orifice section 6B can be replaced with another orifice section.

As shown in FIG. 1, the first orifice section 6A and the second orifice section 6B constitute a throttle unit in the differential-pressure flowmeter 11.

As shown in FIGS. 2 and 3, the first orifice section 6A is a substantially cylindrical component disposed in the depression formed in the downstream end of the upstream-side channel 3A.

The first orifice section 6A is provided with a first throttle channel extending along the center axis thereof, and the first throttle channel has a smaller channel sectional area than that of a second throttle channel.

With this configuration, a smaller flow rate of a chemical solution can be measured, as compared with a case where the first orifice section 6A has a larger channel sectional area than that of the second orifice section 6B or a case where the two orifice sections have substantially the same channel sectional area.

This embodiment is described as being applied to a case where the channel sectional area of the first throttle channel in the first orifice section 6A is an area at which a flow rate ranging from about 3 (ml/min) to about 30 (ml/min) can be measured in the differential-pressure flowmeter 11.

As shown in FIGS. 2 and 3, the second orifice section 6B is a substantially cylindrical component disposed in the depression formed in the downstream end of the bypass channel 5.

The second orifice section 6B is provided with a second throttle channel extending along the center axis thereof, and the second throttle channel has a larger channel sectional area than that of the first throttle channel.

This embodiment is described as being applied to a case where the channel sectional area of the second throttle channel in the second orifice section 6B is an area at which, used together with the first orifice section 6A, a flow rate ranging from about 20 (ml/min) to about 200 (ml/min) can be measured in the differential-pressure flowmeter 11.

As shown in FIG. 2, the on/off valve 7 is configured to control the flow of the chemical solution into the bypass channel 5 and the second orifice section 6B. The on/off valve 7 is disposed adjacent to the upstream-side pressure sensor 4A, located at the upper surface of the first body 2A, on the downstream side thereof (i.e., the left side thereof in FIG. 2) as viewed in the direction of flow of the chemical solution.

The on/off valve 7 is provided with a valve plug 71, the valve chamber 72, and the valve seat 73.

Note that the on/off valve 7 may be a known on/off valve; it is not limited in particular.

As shown in FIG. 2, the valve plug 71 moves vertically (vertically in FIG. 2) within the valve chamber 72 so as to control the flow of the chemical solution together with the valve seat 73.

The valve plug 71 is provided with a main body extending vertically and formed in a substantially cylindrical shape, and a diaphragm segment having a thin film and formed in a flange shape extending from the peripheral surface of the cylindrical main body.

The lower end of the main body of the valve plug 71 moves into and out of contact with the valve seat 73 so as to control the flow of the chemical solution in the bypass channel 5 and the second orifice section 6B.

Specifically, the lower end of the main body of the valve plug 71 moves into contact with the valve seat 73 so as to stop the flow of the chemical solution in the bypass channel 5 and the second orifice section 6B. On the other hand, the lower end of the main body of the valve plug 71 moves out of contact with the valve seat 73 so as to cause the chemical solution to flow into the bypass channel 5 and the second orifice section 6B.

The diaphragm segment of the valve plug 71 partly constitutes a wall surface of the valve chamber 72 and allows the main body of the valve plug 71 to move in the vertical direction.

Specifically, the diaphragm segment of the valve plug 71 constitutes an upper wall surface of the valve chamber 72, and when the thin film of the diaphragm segment deforms, the main body of the valve plug 71 can move in the vertical direction.

As shown in FIG. 2, the valve chamber 72 is a space that is in communication with the bypass channel 5 and accommodates the main body of the valve plug 71. Moreover, the valve seat 73 is formed in substantially the center of the bottom surface (i.e., the lower surface in FIG. 2) of the valve chamber 72.

The valve chamber 72 is mainly formed by a substantially cylindrical-shaped space with an upward-facing opening formed in the first body 2A and the diaphragm segment of the valve plug 71 that blocks the opening of the space.

An end of the bypass channel 5 that connects the valve chamber 72 and the upstream-side channel 3A opens in the bottom surface of the valve chamber 72. Another end of the bypass channel 5 that connects the valve chamber 72 and the downstream-side channel 3B opens in the peripheral surface of the valve chamber 72.

As shown in FIG. 2, the valve seat 73 is an opening of the bypass channel 5 that is formed in the bottom surface of the valve chamber 72 and controls the flow of the chemical solution in the bypass channel 5 and the second orifice section 6B together with the main body of the valve plug 71.

As shown in FIG. 1, the flow-rate control valve 8 controls the flow rate of the chemical solution flowing through the flow-rate controller 1. Specifically, the flow-rate control valve 8 controls the flow rate of the chemical solution flowing out from the flow-rate controller 1 on the basis of the flow rate of the chemical solution measured by the differential-pressure flowmeter 11.

As shown in FIG. 4, the flow-rate control valve 8 is disposed adjacent to the downstream-side pressure sensor 4B, located at the upper surface of the second body 2B, on the downstream side thereof (i.e., the left side thereof in FIG. 4) as viewed in the direction of flow of the chemical solution.

The flow-rate control valve 8 is provided with a valve plug 81, a valve chamber 82, and a valve seat 83.

As shown in FIG. 4, the valve plug 81 moves vertically (vertically in FIG. 4) within the valve chamber 82 so as to control the flow of the chemical solution together with the valve seat 83.

The valve plug 81 is provided with a main body partly constituting a wall surface of the valve chamber 82, a bellows segment extending downward (downward in FIG. 4) from the main body, a large-diameter segment disposed at a lower end of the bellows segment and formed in a cylindrical shape with a large diameter, and a small-diameter segment extending downward (downward in FIG. 4) from the large-diameter segment and formed in a cylindrical shape with a small diameter.

As shown in FIG. 4, in addition to partly constituting the wall surface of the valve chamber 82, the main body of the valve plug 81 has an upper end of the bellows segment attached thereto.

Specifically, the main body of the valve plug 81 is formed in a cylindrical shape with a closed upper end and has the aforementioned bellows segment, large-diameter segment, and small-diameter segment disposed therein. A rod that causes the large-diameter segment and the small-diameter segment of the valve plug 81 to move in the vertical direction extends through a through-hole formed in the upper end surface of the main body of the valve plug 81.

As shown in FIG. 4, the bellows segment of the valve plug 81 is disposed between the main body of the valve plug 81 and the large-diameter and small-diameter segments of the valve plug 81, and is expandable and contractible in the vertical direction (vertical direction in FIG. 4). In other words, the upper end of the bellows segment of the valve plug 81 is connected to the main body of the valve plug 81, whereas the lower end is connected to the large-diameter segment of the valve plug 81.

Furthermore, the rod that causes the large-diameter segment and the small-diameter segment of the valve plug 81 to move in the vertical direction extends inside the valve plug 81.

The large-diameter segment and the small-diameter segment of the valve plug 81, together with the valve seat 83, control the flow rate of the chemical solution flowing through the downstream-side channel 3B.

Specifically, the flow rate of the chemical solution flowing through the downstream-side channel 3B is controlled by adjusting how much the small-diameter segment protruding downward from the large-diameter segment of the valve plug 81 is inserted into an opening formed in the valve seat 83. Furthermore, the flow of the chemical solution in the downstream-side channel 3B is stopped by bringing the large-diameter segment of the valve plug 81 and the valve seat 83 into contact with each other.

As shown in FIG. 4, the valve chamber 82 is a space that is in communication with the downstream-side channel 3B and accommodates the bellows segment, the large-diameter segment, and the small-diameter segment of the valve plug 81.

Moreover, the valve seat 83 is formed in substantially the center of the bottom surface (i.e., the lower surface in FIG. 4) of the valve chamber 82.

The valve chamber 82 is mainly formed by a substantially cylindrical-shaped space with an upward-facing opening formed in the second body 2B and the main body of the valve plug 81 that blocks the opening of the space.

An end of the downstream-side channel 3B that supplies the chemical solution to the valve chamber 82 opens in the bottom surface of the valve chamber 82. The downstream-side channel 3B extends substantially horizontally until reaching below the valve chamber 82, bends upward in a substantially orthogonal direction below the valve chamber 82, and connects with the valve chamber 82.

The above-described small-diameter segment of the valve plug 81 is inserted in this opening.

Another end of the downstream-side channel 3B through which the chemical solution flows out from the valve chamber 82 opens in the peripheral surface of the valve chamber 82. The downstream-side channel 3B slopes downward with increasing distance from the valve chamber 82 and then extends in substantially the horizontal direction.

As shown in FIG. 4, the valve seat 83 is an opening of the downstream-side channel 3B that is formed in the bottom surface of the valve chamber 82 and controls the flow of the chemical solution in the downstream-side channel 3B together with the valve plug 81. In other words, the valve seat 83 controls the flow of the chemical solution in the flow-rate controller 1.

Note that the flow-rate control valve 8 may be a known on/off valve; it is not limited in particular.

FIG. 5 is a block diagram for explaining the configuration of the control unit 9.

As shown in FIGS. 1 and 5, the control unit 9 controls the flow-rate control valve 8 so as to control the flow rate of the chemical solution flowing through the flow-rate controller 1.

As shown in FIG. 5, the control unit 9 receives a target value, input to an input unit 91, for the flow rate of the chemical solution, the pressure of the chemical solution, measured by the upstream-side pressure sensor 4A, flowing through the upstream-side channel 3A, and the pressure of the chemical solution, measured by the downstream-side pressure sensor 4B, flowing through the downstream-side channel 3B.

Furthermore, the control unit 9 outputs a control signal for controlling the opening and closing of the on/off valve 7 and a control signal for controlling the valve opening of the flow-rate control valve 8, as shown in FIG. 5.

Next, a method of controlling the flow rate in the flow-rate controller 1 having the above configuration will be described.

First, the following description will be directed to a case where a predetermined flow rate ranging from about 3 (ml/min) to about 30 (ml/min) is input as a control target to the input unit 91.

As shown in FIG. 5, a flow-rate value of the chemical solution input as a control target to the input unit 91 is output to the control unit 9. The control unit 9 outputs a control signal for closing the on/off valve 7 since the flow-rate value of the chemical solution, which is a control target, is a flow rate that can be measured by using the first orifice section 6A alone.

As shown in FIGS. 1 and 2, the on/off valve 7 moves the valve plug 71 downward on the basis of the control signal so as to bring the valve plug 71 into contact with the valve seat 73. In consequence, the on/off valve 7 is closed.

In this case, the pressure of the chemical solution flowing through the upstream-side channel 3A is measured by the upstream-side pressure sensor 4A, as shown in FIGS. 1 and 2, and the measured pressure value of the chemical solution is input to the control unit 9, as shown in FIG. 5.

On the other hand, the chemical solution flowing through the upstream-side channel 3A entirely flows into the first orifice section 6A without flowing into the bypass channel 5.

When the chemical solution passes through the first orifice section 6A, the pressure thereof decreases in accordance with the flow rate of the chemical solution.

Specifically, the following relational expression (1) is satisfied:

$$Q1 = k1\sqrt{(P1-P2)} \quad (1)$$

where P1 denotes the pressure of the chemical solution in the upstream-side channel 3A, P2 denotes the pressure of the chemical solution in the downstream-side channel 3B, and Q1 denotes the flow rate of the chemical solution passing through the first orifice section 6A.

Note that a proportionality coefficient k1 in the expression (1) is a constant set in accordance with the shape of the first orifice section 6A or the hole diameter of the orifice and is a value determined by actual measurement.

Furthermore, the flow rate Q1 of the chemical solution passing through the first orifice section 6A is equal to the flow rate of the chemical solution passing through the flow-rate controller 1.

As shown in FIGS. 1 and 4, the chemical solution with decreased pressure as a result of passing through the first orifice section 6A flows into the downstream-side channel 3B. The pressure of the chemical solution flowing through the downstream-side channel 3B is measured by the downstream-side pressure sensor 4B, and the measured pressure value of the chemical solution is input to the control unit 9, as shown in FIG. 5.

The control unit 9 calculates the flow rate of the chemical solution flowing through the upstream-side channel 3A and the downstream-side channel 3B on the basis of the pressure values of the chemical solution received from the upstream-side pressure sensor 4A and the downstream-side pressure sensor 4B and the aforementioned expression (1).

Furthermore, the control unit 9 compares the calculated flow-rate value with the input control-target flow-rate value, and outputs a control signal for controlling the valve opening of the flow-rate control valve 8 so that the calculated flow-rate value becomes closer to the input control-target flow-rate value.

An example of a control method for the flow-rate control valve 8 in the control unit 9 includes feedback control, such as PID control.

For example, when the calculated flow-rate value is smaller than the control-target flow-rate value, the control unit 9 outputs a control signal for increasing the valve opening for the flow-rate control valve 8.

As shown in FIGS. 1 and 4, the flow-rate control valve 8 moves the valve plug 81 away from the valve seat 83 on the basis of the control signal so as to increase the valve opening.

This increases the flow rate of the chemical solution passing through the flow-rate control valve 8, causing the flow-rate value of the chemical solution flowing through the flow-rate controller 1 to be increased to the control-target flow-rate value.

In contrast, if the calculated flow-rate value is larger than the control-target flow-rate value, the control unit 9 outputs a control signal for reducing the valve opening for the flow-rate control valve 8.

As shown in FIGS. 1 and 4, the flow-rate control valve 8 moves the valve plug 81 toward the valve seat 83 on the basis of the control signal so as to reduce the valve opening.

This decreases the flow rate of the chemical solution passing through the flow-rate control valve 8, causing the flow-rate value of the chemical solution flowing through the flow-rate controller 1 to be decreased to the control-target flow-rate value.

The following description will be directed to a case where a predetermined flow rate ranging from about 20 (ml/min) to about 200 (ml/min) is input as a control target to the input unit 91.

As shown in FIG. 5, a flow-rate value of the chemical solution input as a control target to the input unit 91 is output to the control unit 9. The control unit 9 outputs a control signal for opening the on/off valve 7 since the flow-rate value of the chemical solution, which is a control target, is a flow rate that can be measured by using the first orifice section 6A and the second orifice section 6B.

In an area where the flow-rate range measurable by using the first orifice section 6A alone overlaps the flow-rate range measurable by using the first orifice section 6A and the second orifice section 6B, the flow rate may be measured by using the first orifice section 6A alone or by using the first orifice section 6A and the second orifice section 6B, and is not limited in particular.

As shown in FIGS. 1 and 2, the on/off valve 7 moves the valve plug 71 upward on the basis of the control signal so as to move the valve plug 71 away from the valve seat 73. In consequence, the on/off valve 7 is opened, causing a portion of the chemical solution flowing through the upstream-side channel 3A to flow into the bypass channel 5.

The chemical solution flowing into the bypass channel 5 passes through the on/off valve 7 so as to flow into the second orifice section 6B. On the other hand, the chemical solution flowing through the upstream-side channel 3A without flowing into the bypass channel 5 flows into the first orifice section 6A.

Regarding the chemical solution passing through the second orifice section 6B, the pressure of the chemical solution decreases as it passes through the second orifice section 6B in accordance with the flow rate thereof.

Specifically, the following relational expression (2) is satisfied:

$$Q2 = k2\sqrt{(P1-P2)} \quad (2)$$

where P1 denotes the pressure of the chemical solution in the upstream-side channel 3A, P2 denotes the pressure of the chemical solution in the downstream-side channel 3B, and Q2 denotes the flow rate of the chemical solution passing through the second orifice section 6B.

Note that a proportionality coefficient k2 in the expression (2) is a constant set in accordance with the shape of the second orifice section 6B or the hole diameter of the orifice and is a value determined by actual measurement.

Furthermore, the sum of the flow rate Q1 of the chemical solution passing through the first orifice section 6A and the flow rate Q2 of the chemical solution passing through the second orifice section 6B is equal to the flow rate of the chemical solution passing through the flow-rate controller 1.

As shown in FIGS. 1 and 4, the chemical solution with decreased pressure as a result of passing through the first orifice section 6A and the second orifice section 6B flows into the downstream-side channel 3B. The pressure of the chemical solution flowing through the downstream-side channel 3B is measured by the downstream-side pressure sensor 4B, and the measured pressure value of the chemical solution is input to the control unit 9, as shown in FIG. 5.

The control unit 9 calculates the flow rate of the chemical solution flowing through the upstream-side channel 3A and the downstream-side channel 3B on the basis of the pressure values of the chemical solution received from the upstream-side pressure sensor 4A and the downstream-side pressure sensor 4B and the aforementioned expressions (1) and (2).

The control performed in the control unit 9 hereafter is the same as that described above, and therefore, the description thereof will not be repeated.

According to the above configuration, since the first orifice section 6A, the second orifice section 6B, and the on/off valve 7 for controlling the flow of the chemical solution in the second orifice section 6B are provided, the flow rate can be measured over a wide flow-rate range while an increase in the cost of manufacture of the flow-rate controller 1 can be minimized.

Specifically, when the flow rate of the chemical solution is within a flow-rate range that can be measured by using the first orifice section 6A alone, the on/off valve 7 is closed so that the chemical solution is made to pass through only the first orifice section 6A, and the upstream-side pressure sensor 4A and the downstream-side pressure sensor 4B are used to measure the difference in pressure of the chemical solution before and after the first orifice section 6A, thereby measuring the flow rate of the chemical solution.

On the other hand, if the flow rate of the chemical solution exceeds the flow-rate range that can be measured by using the first orifice section 6A alone, the on/off valve 7 is opened so that the chemical solution is made to pass through the first orifice section 6A and the second orifice section 6B, and the upstream-side pressure sensor 4A and the downstream-side pressure sensor 4B are used to measure the difference in pressure of the chemical solution before and after the first orifice section 6A and the second orifice section 6B, thereby measuring the flow rate of the chemical solution.

What is claimed is:

1. A flowmeter comprising:
    an upstream-side channel and a downstream-side channel through which a fluid, which is a measurement target, flows;
    an upstream-side pressure sensor that measures the pressure of the fluid in the upstream-side channel;
    a downstream-side pressure sensor that measures the pressure of the fluid in the downstream-side channel;
    a first throttle section disposed between the upstream-side channel and the downstream-side channel and having a channel area that is smaller than that of at least the upstream-side channel;
    a bypass channel branching off from between the upstream-side pressure sensor in the upstream-side channel and the first throttle section and connected with the downstream-side channel;
    an on/off valve that controls the flow rate of the fluid flowing through the bypass channel; and
    a second throttle section disposed between the bypass channel and the downstream-side channel and having a channel area that is smaller than that of at least the bypass channel.

2. The flowmeter according to claim 1, wherein the first throttle section has a channel sectional area that is smaller than that of the second throttle section.

3. The flowmeter according to claim 1 or 2, wherein the on/off valve is provided with a valve plug and a valve seat, and
    wherein a surface of the valve seat is disposed on substantially the same plane as a lower end of an inner surface of the bypass channel extending substantially horizontally from the on/off valve towards the second throttle section.

4. The flowmeter according to any one of claims 1 to 3, further comprising:
    a first housing in which the upstream-side channel, the upstream-side pressure sensor, the first throttle section, the bypass channel, the second throttle section, and the on/off valve are disposed; and
    a second housing in which the downstream-side channel and the downstream-side pressure sensor are disposed,
    wherein the first housing and the second housing are connectable to and disconnectable from each other.

5. The flowmeter according to claim 4, wherein at least one of the first throttle section and the second throttle section is detachable from the first housing.

6. A flow-rate controller comprising:
    the flowmeter according to claim 1; and
    a control valve that controls the flow rate of the fluid.

* * * * *